E. BADLAM.
SEEDING HARROW.
No. 32,554. Patented June 18, 1861.
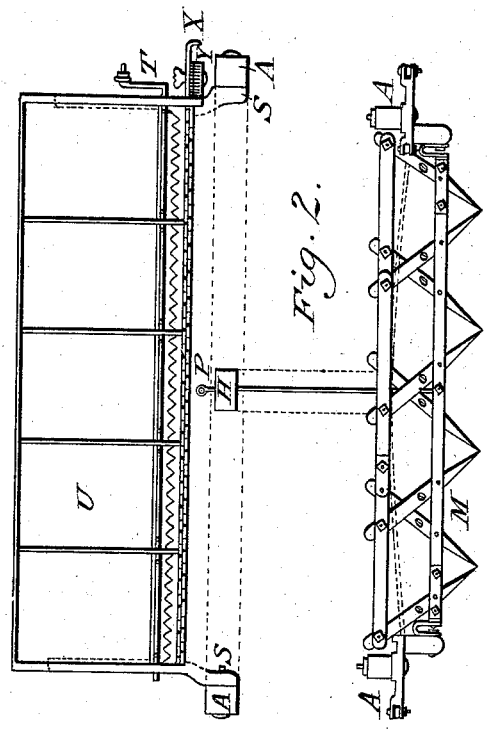
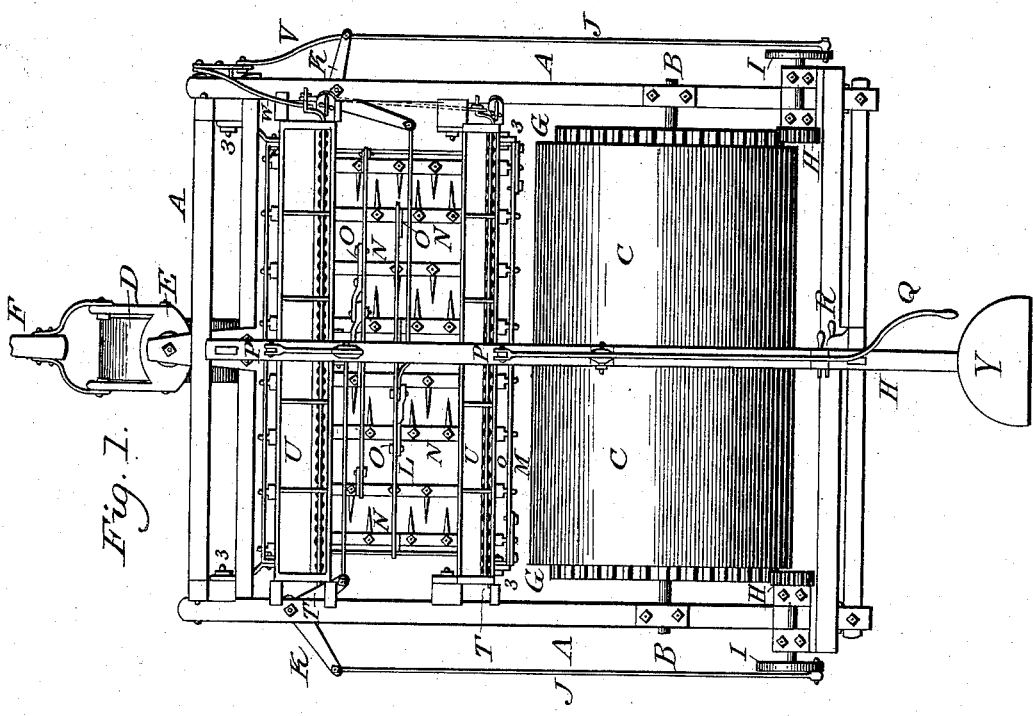

UNITED STATES PATENT OFFICE.

EDWARD BADLAM, OF OGDENSBURG, NEW YORK.

SEEDING-HARROW.

Specification of Letters Patent No. 32,554, dated June 18, 1861.

*To all whom it may concern:*

Be it known that I, EDWARD BADLAM, of Ogdensburg, in the county of St. Lawrence, in the State of New York, have invented a new and useful Transverse Harrow, Seed-Sower, and Roller Combined; and I do hereby declare that the following is a full and exact description thereof, reference being had to the accompanying drawings and to the characters of reference marked thereon.

The nature of my invention consists in constructing a roller of the ordinary size with drive wheels attached to the ends of roller which is to be propelled by gearing belts or chains. The roller is to be made whole or in two parts as in Figure 1, as desired, with a shaft extending through the same. At the ends of the shaft a suitable frame is attached and supported at its rear end and at the forward end of the frame is attached a wheel D. that supports the forward end of frame A. and on the frame A. front of the roller C. is attached a transverse harrow frame M. that is suspended from the four corners by means of cranks 3. 3. 3. that admits of the raising and falling the harrow frame M. and it being so constructed and connected by frame A. to roller C. and drive wheels G. at ends of roller C. attached to pinion wheels H. H. and crank wheels I. I. attached to shafts and connected to rods J. J. attached to cranks K. K. and to cross bars L. L. connected to bars N. N. N. and rods P. P. connected to harrow frame M. and connected by cranks to lever Q. which enables the operator while seated at Y. to raise and fall the harrow frame at pleasure, also rods V. and W. which are attached to cranks K. K. and to shafts T. T. pasing through seed boxes U. U. causing the grain to fall equally.

X. X. are double sliding bottoms in which are inserted a suitable number of holes. Also the same number of holes are inserted in the bottom of seed boxes U. U. so in moving sliding bottom X. X. the holes are open or shut thus enabling the operator to govern the quantity of seed to be sown as desired, thus combining the harrow seed sower and roller. The harrow partly harrows the land and then sows the seed and then harrows in the grain and then sows the grass seed if desired and then rolls the land, all done in once going over the land, and leaves the land in a fine condition for the reaper in the fall.

To enable others skilled in the art to make and use my invention I will proceed to describe its construction and operation.

A. is a quadrangular frame supported at its rear end by a shaft B. extending through roller C. which is made whole or in two parts as in Fig. 1. At the forward end of frame A. is attached a wheel D. which is attached to frame A. by an iron frame E. and connecting piece fastened to frame A. To the iron frame E. is attached the tongue F. and enables the operator to turn the machine either way at pleasure.

G. G. are two drive wheels attached at the ends of roller C.

H. H. are two pinion wheels connected to drive wheels on roller C. attached to shafts, and on one end of shafts are attached crank wheels I. I., and to these wheels are attached two rods J. J. which extend to cranks K. K. and are attached to the outside ends of tached two rods J. J. which extend to cranks K. K. are attached rods that extend to cross bars L. L. and are attached.

M. is a harrow frame made of wood or iron bent at right angles at two corners and extending to the other corners of the frame M., in which is inserted a piece and attached to the other piece bent thus forming the harrow frame. At the corners of frame M., in which is inserted a piece and are attached to frame A., thus enabling the harrow frame to rise and fall as desired. In the harrow frame M. are attached bars N. N. N. and in these bars is attached a suitable number of teeth fastened. The bars N. N. N. are attached to frame M. at the ends and placed parallel to each other horizontally across frame M. from front to rear sides and attached, thus supporting bars and substantially keeping them in place.

On the top of bars N. N. N. near the middle are attached perpendicular bars O. O. O. that are attached to cross bars L. L. which bars L. L. are attached to rods attached to cranks K. K. Thus when the machine is in motion the bars N. N. N. every other one moves in in the opposite direction to the others thus giving a double transverse motion to the right and left, thus thoroughly pulverizing the soil.

P. P. are two rods placed perpendicularly above frame M. The lower ends are attached to a rod passing through frame M. from front to rear sides, and at the upper ends of rods P. P. are attached cranks and to these cranks are attached rods that are attached to lever Q., thus enabling the operator while seated at Y. to raise and fall the harrow at pleasure.

R. is a bar. At each end are attached the two pinion wheels that are attached to drive wheels G. G. At the middle of bar is attached a perpendicular piece that extends up to horizontal piece H. and by moving the perpendicular piece the pinion wheels are thrown out and in gear as desired and by a pin that passes through perpendicular piece the pinion wheels are kept in or out of gear as desired.

S. S. are pieces attached to seed boxes U. and to frame A.

T. T. are shafts passing through seed boxes U. U. To shafts T. T. are attached plates with niches inserted which move above the holes in seed boxes, thus stirring the seed and causing it to fall equally. The shafts T. T. are moved by crank at the end of seed box U. that is attached to rods V. and W. which are attached to cranks K. K. giving a backward and forward motion.

X. is a double sliding bottom in which is inserted a suitable number of holes of sufficient size. Also the same number of holes and size is inserted in the seed boxes U. U. at the bottom, so in moving the sliding bottom X. the holes are open or shut as desired, thus enabling the operator to govern the quantity of seed to be sown at pleasure.

What I claim as my invention and desire to secure by Letters Patent is—

The arrangement of the transverse harrow M. seed sowers U. U. and roller C. all receiving their motion from roller C. and combined and arranged for the purposes herein set forth.

EDWARD BADLAM.

Witnesses:
  JOEL M. JOHNSON,
  PHILIP VAN BUSSUM.